Sept. 11, 1928.  F. E. TOOTHAKER  1,633,336
MANUFACTURE OF SHOES
Filed Dec. 29, 1921    2 Sheets-Sheet 1
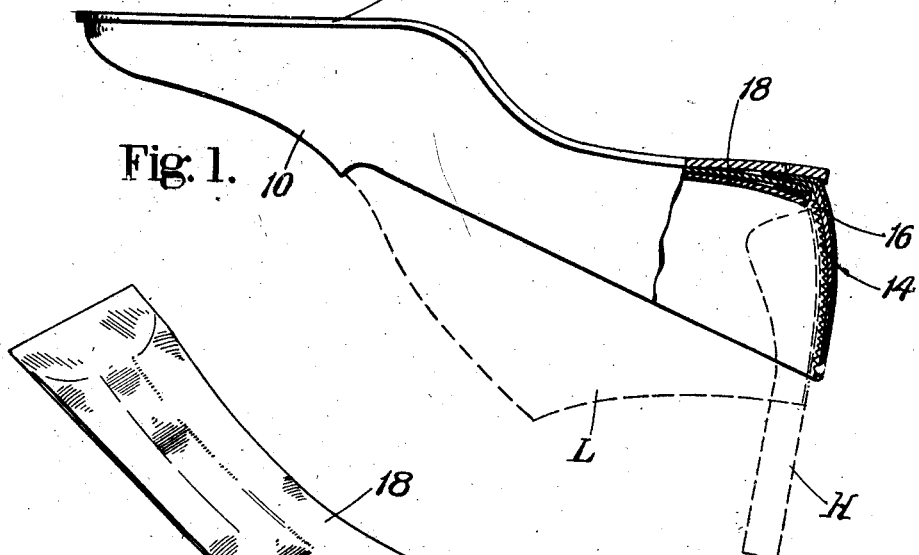
Fig. 1.
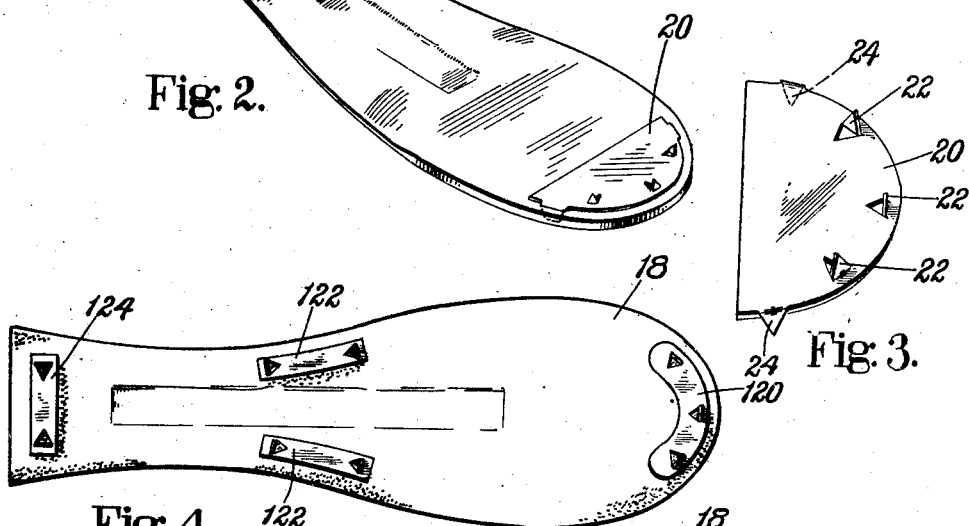
Fig. 2.
Fig. 3.
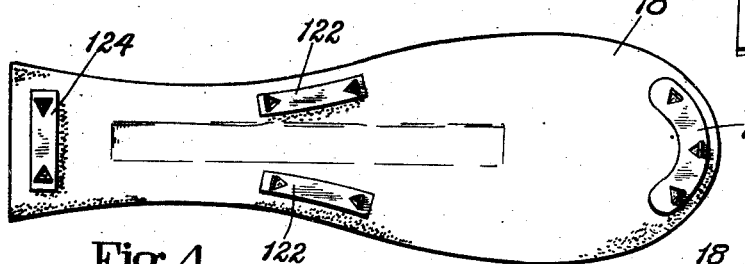
Fig. 4.
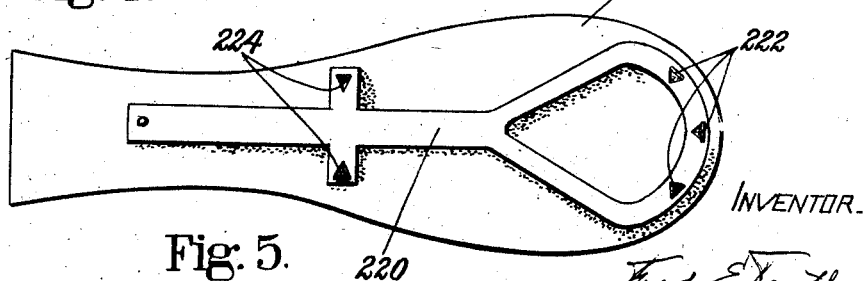
Fig. 5.
INVENTOR.
Fred E. Toothaker
By his Attorney
Nelson W. Howard Patented Sept. 11, 1928.

1,683,636

UNITED STATES PATENT OFFICE.

FRED E. TOOTHAKER, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

MANUFACTURE OF SHOES.

Application filed December 29, 1921. Serial No. 525,590.

This invention relates to the manufacture of turned shoes, and has for an object the improvement of such manufacture, as hereinafter explained.

In the manufacture of most shoes of this type, the lining of the shoe is not fastened in around the heel-seat when the sole and upper are secured together, but is smoothed down into the counter portion of the shoe after turning. In this unattached condition it sometimes happens, especially if the lining be a little short, that the friction of the horn used in relasting is sufficient to displace the smoothed lining, forming wrinkles. This necessitates a troublesome and time-consuming operation in smoothing out such wrinkles and rearranging the lining. In some cases a shank piece is put in the shoe just after turning, to cover the margin of the lining, and in some cases a coating of adhesive is placed on the counter before the lining is smoothed against it. But as the shoe is re-lasted immediately, the wet adhesive has no tendency to hold the lining against the friction of the horn, nor is the friction of the shank piece sufficient for this purpose. On the contrary it will be apparent that the adhesive will set afterwards and hold the wrinkles in place, and that the shank piece, whether placed in the shoe after turning or applied to the second last before it is inserted, adds greatly to the difficulty of removing the wrinkles.

It is accordingly proposed to obviate these difficulties by securing the unattached lining in place after the turning of the shoe, in a manner positively to prevent displacement thereof during the relasting operation, and for this purpose the accompanying drawings illustrate the use of a shank piece extending between the marginal portions of the upper and of the lining and provided with lining-engaging means, such as a metallic fastener, to fasten the lining and the shank piece together. For turned shoes of the molded counter type, a split shank may be used, one flap being secured to the counter in lieu of a tuck, and either flap carrying means to engage and hold the lining which is received between the flaps, as will be explained.

In another aspect, the invention consists in the provision of a shank piece comprising a piece of fibrous stock provided with an attaching plate having means at one side to secure it to the shank piece and means at the other side of the plate for securing the shank piece to a shoe. In one form the shank piece is especially adapted to engage the lining of a turned shoe and hold it against displacement. I prefer to use a pronged plate of soft metal which will offer little resistance to the passage of nails or tacks during heeling and other subsequent operations, but it will be appreciated that other fastening devices may be used. Such shank pieces, either alone or attached to molded counters as above explained, can readily be made with machinery already well known in shank factories, and distributed conveniently by such factories to the shoe manufacturers.

The above and other phases of the invention will be apparent from the following description of the illustrative figures of the accompanying drawings in which, Fig. 1 is a view partly in side elevation and partly in section showing a molded counter turned shoe made according to the present invention, with the second last and relasting horn shown in dotted lines;

Fig. 2 is a perspective of one form of shank piece which may be used;

Fig. 3 is a detached perspective of a pronged metal plate such as is used in making the shank piece shown in Fig. 2;

Figs. 4 and 5 are bottom plan views of alternative forms of shank pieces;

Figure 6:
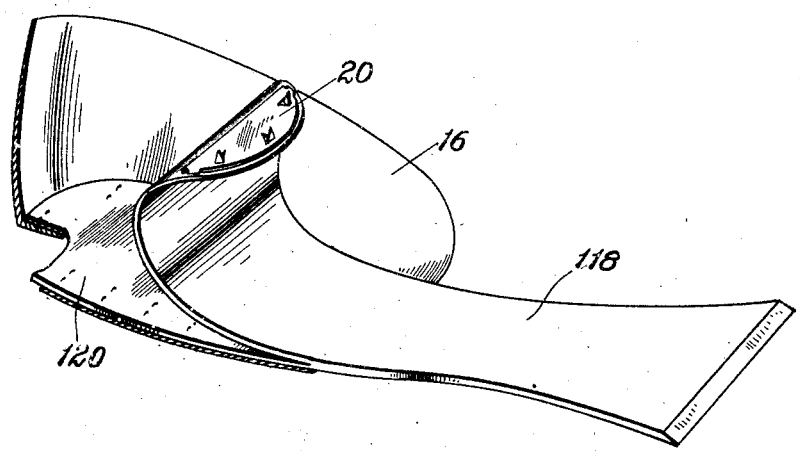
Fig. 6 is a perspective showing a split shank attached to a molded counter and carrying a lining-engaging pronged plate.

A shoe made in accordance with the present invention comprises an upper 10 and a sole 12 secured together in the usual manner, a lining 14 secured at one edge to the upper and sewed in with the upper in the sole-attaching seam about the forepart of the shoe but not about the heel seat, a counter 16 which may be a molded counter, and a shank piece 18 shown in section in Fig. 1 and in perspective in Fig. 2. As shown by the dotted lines in Fig. 1 when the shoe is pulled on a second last L by the use of the usual horn H or an equivalent implement, the lining is engaged frictionally by the horn and there is a very considerable tendency for the unattached end to be pulled out in a manner which will form wrinkles in the lining between the last and the counter.

To obviate this difficulty, as previously explained, I provide means for holding the unattached edge of the lining during the relasting operation which may be in the form of a metallic fastener such as a pronged metal plate 20 carried by the shank piece 18. As shown in Fig. 3, prongs 22 are struck up from one face of this plate to engage the lining and prongs 24 may be struck up from the opposite face to fasten the plate to the shank piece.

In Figs. 4 and 5 are shown alternative forms of shank pieces such as may be used in carrying the present invention into effect. In the form shown in Fig. 4 a pronged metal plate 120 is provided at the heel end of the shank piece and plates 122 are provided at opposite sides to come approximately at the heel breast line of the shoe and engage the unattached sides of the lining just rearwardly of the points where the lining begins to be sewed in with the upper. Another pronged plate 124 may be provided to engage the sole at the forward end of the shank piece to hold the shank piece itself against displacement relatively to the sole. It will be observed that the prongs of the other plates such as shown at 120 and 122 will ordinarily be long enough so that they also will engage the sole and co-operate in holding the shank piece in place. Accordingly, as previously pointed out, the invention may be regarded from one point of view as directed to the provision of a shank piece carrying shoe engaging fasteners such as these pronged plates and which in the forms illustrated herein may have these fasteners arranged to engage and hold the lining as above described.

In the form illustrated in Fig. 5 the shank piece is provided with a metallic stiffening member 220 which is formed with prongs 222 to engage the rear end of the lining and prongs 224 to engage it at substantially the forward ends of the counter. I prefer to use a soft metal for making the form of plate shown in Fig. 2 so that the heeling nails may pass through it without any substantial resistance; in the form shown in Fig. 5, however, this is not feasible as the plate extends to form an arch-supporting stiffening member which must be of relatively hard metal and accordingly in this form (and also in the form shown in Fig. 4) the plate is cut away about the center of the heel seat so that it will not interfere with the heeling operation.

Figure 7:
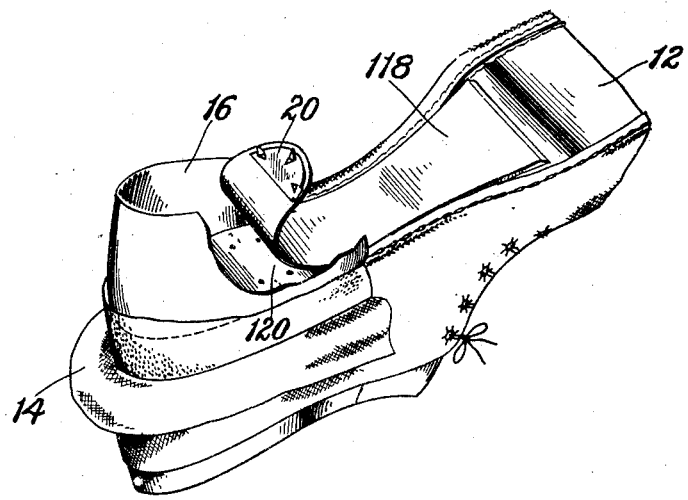
Fig. 7 is a view of a turned shoe embodying the structure of Fig. 6 while it is still on the first last.

As shown in Fig. 6 my invention may be applied to an assemblage made up of a molded counter 16 and a split shank piece 118, one flap 120 of which is fastened to the counter in lieu of the usual "tuck". A pronged plate 20 or other suitable lining-securing agent may be fastened to one of the flaps to hold the unattached edge of the lining which is received between the two flaps of the split shank. Fig. 7 illustrates the use of the assemblage shown in Fig. 6 and shows a shoe on the first last with the counter and shank piece in place.

While I have illustrated and described specific structures which may be used to obtain the advantages of my invention, it is not my intention to limit its scope thereby or otherwise than by the terms of the appended claims.

Having described my invention, what I claim as new and desire to secure by Letters Patent of the United States is:—

1. A turned shoe comprising, in combination, a sole, an upper, a lining, a molded counter between the upper and the lining, a shank piece split at its rear end to form two flaps and having the lower margin of the lining between the flaps, means to fasten one flap to the counter to form a bottom piece or tuck therefor, and means to fasten one or both flaps to the lining to hold it against displacement.

2. A turned shoe comprising, in combination, a sole and an upper, a lining secured at its upper margin to the upper, and means to penetrate the lower margin of the lining and hold it against displacement and to present a smooth upper surface to engage a foot in the shoe.

3. A turned shoe comprising, in combination, a sole, an upper, a lining, a shank piece extending between the marginal portions of the upper and of the lining, and means on the shank piece engaging the margin of the lining, to fasten the lining and the shank piece together to prevent displacement of the lining.

4. A turned shoe comprising, in combination, a sole, an upper, a lining, and a metallic fastening device extending between the margins of the upper and of the lining to hold the lining against displacement.

5. A turned shoe comprising, in combination, a sole, an upper, a lining, and a plate having prongs to secure the lower margin of the lining against displacement.

6. A turned shoe comprising, in combination, a sole, an upper having an inturned lower margin secured to the sole, a lining for the upper, a shank piece extending between the margins of the upper and of the lining, and fastening means on the shank piece to hold the lining against displacement.

7. A turned shoe comprising, in combination, a sole, an upper, a lining, a shank piece, and a metal plate having prongs to engage the shank piece and other prongs to engage the lining.

8. A device to be incorporated in turned shoes comprising, in combination, a molded counter, a shank piece split at its rear end to form two flaps, means to fasten one of the flaps to the counter to form a bottom piece or tuck therefor, and a fastening agent carried by one of the flaps to engage and hold the margin of a shoe lining received between the flaps.

9. A device to be incorporated in turned shoes comprising, in combination, a molded counter, a shank piece split at its rear end to form two flaps, means to fasten one of the flaps to the counter to form a bottom piece or tuck therefor, and prongs carried by one of the flaps to engage and hold the margin of a shoe lining received between the flaps.

10. A shank piece comprising a piece of fibrous stock split at its rear end to provide two flaps, and a fastening agent secured to the inner surface of one of the flaps to engage and hold a shoe part received between the flaps.

11. A shank piece comprising a piece of fibrous stock split at its rear end to provide two flaps, and a metallic fastener secured to the inner surface of one of the flaps to engage and hold a shoe part received between the flaps.

12. A shank piece comprising a piece of fibrous stock split at its rear end to provide two flaps, and a pronged metal plate secured to the inner surface of one of the flaps to engage and hold a shoe part received between the flaps.

13. A shank piece comprising, in combination, a piece of stock having a smooth surface to support a foot in a shoe in which the shank piece is embodied, a plate having means at one side to secure it to the shank piece, and means at the opposite side of the plate for holding the lining of a shoe in place.

14. A shank piece comprising, in combination, a piece of stock having a smooth surface to support a foot in a shoe in which the shank piece is embodied, a plate having means at one side to secure it to said piece of stock, and means located at the opposite side of the plate and rendered operative by placing the shank piece in the shoe to hold the lower margin of the lining of the shoe against displacement.

15. A shank piece for turned shoes comprising, in combination, a piece of fibrous stock, a fastening plate having means at one side for securing the plate to the fibrous stock, and means at the other side of the plate for securing the stock to a part of a shoe in which the shank piece is incorporated.

16. A shank piece for turned shoes comprising, in combination, a piece of fibrous stock, and a metallic fastening device secured to the lower face of the stock and rendered operative to secure the shank piece to a portion of a partly finished shoe by assembling the shank piece in the shoe.

17. A shank piece for turned shoes comprising, in combination, a piece of fibrous stock, and a member having prongs projecting in one direction to secure said member to the shank piece and other prongs projecting in another direction for attaching the shank piece to a portion of a shoe.

18. A shank piece comprising a piece of fibrous stock having a fastening agent at its heel end arranged to engage the inturned lower margin of a shoe lining and hold it against displacement.

19. A shank piece for turned shoes comprising a piece of fibrous stock having at its heel end a metallic plate attached to the lower face of the stock and provided with outwardly-projecting prongs for attaching the shank piece to a portion of a shoe.

20. A shank piece for turned shoes comprising a piece of fibrous stock and a metal stiffener secured to the lower surface thereof, said stiffener having downwardly projecting marginal prongs to engage a portion of the upper.

21. A shank piece for turned shoes comprising, in combination, a piece of fibrous stock having a smooth upper surface to engage a foot in a shoe made therewith, and a metal plate secured to the lower surface thereof having attaching prongs projecting away from said stock and positioned to engage the inturned lower margin of the lining of the shoe.

22. For use in making a shank piece for turned shoes, a metal plate having prongs projecting from its edge and offset toward one side of the plate to attach the plate to a piece of fibrous stock to make a shank piece, and other prongs offset from the body of the plate in the opposite direction to attach the shank piece to a part of a shoe.

In testimony whereof I have signed my name to this specification.

FRED E. TOOTHAKER.